(12) United States Patent
Chuang

(10) Patent No.: US 6,880,840 B2
(45) Date of Patent: Apr. 19, 2005

(54) CAMBERING VEHICLE HAVING FOLDABLE STRUCTURE

(75) Inventor: Jin Chen Chuang, Taichung (TW)

(73) Assignee: Unique Forces Company Limited, Tortola, Br. (VG)

( * ) Notice: Subject to any disclaimer, the term of this patent is extended or adjusted under 35 U.S.C. 154(b) by 0 days.

(21) Appl. No.: 10/608,398

(22) Filed: Jun. 23, 2003

(65) Prior Publication Data

US 2004/0256821 A1 Dec. 23, 2004

(51) Int. Cl.$^7$ .............................................. B62M 1/00
(52) U.S. Cl. .............................. 280/87.041; 280/87.05; 280/62
(58) Field of Search .................... 280/87.01, 87.021, 280/87.041, 87.042, 87.05, 38, 62, 287

(56) References Cited

U.S. PATENT DOCUMENTS

| | | | |
|---|---|---|---|
| 1,303,127 A | | 5/1919 | Wickman |
| 1,336,100 A | | 4/1920 | Shearer |
| 1,617,357 A | * | 2/1927 | Walter .................. 280/221 |
| 1,664,858 A | | 4/1928 | Headley |
| 2,613,083 A | * | 10/1952 | Moludy .................. 280/42 |
| 4,045,048 A | | 8/1977 | Irwin |
| 4,047,732 A | | 9/1977 | Williams et al. |
| 4,050,711 A | | 9/1977 | Denzer |
| 4,050,712 A | | 9/1977 | Denzer et al. |
| 4,050,713 A | | 9/1977 | Williams |
| 4,054,300 A | | 10/1977 | Winchell |
| 4,065,146 A | | 12/1977 | Denzer |
| 4,071,261 A | | 1/1978 | Winchell |
| 4,076,270 A | | 2/1978 | Winchell |
| 4,087,104 A | | 5/1978 | Winchell et al. |
| 4,087,106 A | | 5/1978 | Winchell |
| 4,087,107 A | | 5/1978 | Winchell |
| 4,087,108 A | | 5/1978 | Winchell |
| 4,088,338 A | | 5/1978 | Winchell et al. |
| 4,123,079 A | | 10/1978 | Biskup |
| 4,133,551 A | | 1/1979 | Biskup |
| 4,165,093 A | | 8/1979 | Biskup |
| 4,325,565 A | | 4/1982 | Winchell |
| 4,526,390 A | | 7/1985 | Skolnik |
| 4,540,192 A | | 9/1985 | Shelton |
| RE32,031 E | | 11/1985 | Winchell |
| 4,776,604 A | | 10/1988 | Valdez et al. |
| 5,039,121 A | | 8/1991 | Holter |
| 5,547,204 A | | 8/1996 | Gamzo |

(Continued)

FOREIGN PATENT DOCUMENTS

| | | | |
|---|---|---|---|
| CA | 2390224 A1 | 5/2001 | |
| WO | WO/92/00217 A1 * | 1/1992 | ........... 280/87.041 |
| WO | WO 01/32470 A3 | 5/2001 | |
| WO | WO 01/32470 A2 | 5/2001 | |

OTHER PUBLICATIONS

Don Sherman, *Camber Jamboree*, Car and Driver Magazine, Jan. 1981, pp. 53–61, USA.

*Primary Examiner*—Christopher P. Ellis
*Assistant Examiner*—Jeff Restifo
(74) *Attorney, Agent, or Firm*—Lerner, David, Littenberg, Krumholz & Mentlik, LLP (57) ABSTRACT

A cambering vehicle includes a front column, and a bracket rotatably attached to the front column with a pivot shaft, a left and a right trailing arm each having a front portion pivotally attached to the bracket with a pivot axle which is preferably inclined relative to the bracket or the front column. A detachably latching device may be used to detachably latch the bracket and thus the trailing arms to the front column at the working position. The bracket and thus the trailing arm may be rotated relative to the front column to the folding position when the detachably latching device releases the bracket relative to the front column.

15 Claims, 8 Drawing Sheets

U.S. PATENT DOCUMENTS

| | | | |
|---|---|---|---|
| 5,785,331 A | 7/1998 | Rappaport | |
| 6,220,612 B1 | 4/2001 | Beleski, Jr. | |
| 6,286,845 B1 * | 9/2001 | Lin | 280/87.05 |
| 6,318,741 B1 | 11/2001 | Chen | |
| 6,343,798 B1 * | 2/2002 | Chen et al. | 280/5.26 |
| 6,367,829 B1 * | 4/2002 | Lee | 280/87.05 |
| 6,378,879 B1 * | 4/2002 | Rappaport | 280/87.041 |
| 6,428,021 B1 * | 8/2002 | Tung | 280/87.041 |
| 6,450,517 B1 * | 9/2002 | Lee | 280/87.041 |
| 6,467,781 B1 | 10/2002 | Feng | |
| 6,467,986 B1 | 10/2002 | Feng | 403/93 |
| 6,485,039 B1 * | 11/2002 | Ming-Fu | 280/87.041 |
| 6,499,751 B1 | 12/2002 | Beleski, Jr. | |
| 6,517,093 B1 * | 2/2003 | Feng | 280/87.042 |
| 6,554,302 B1 | 4/2003 | Liu | |
| 6,719,310 B1 * | 4/2004 | Lin | 280/87.041 |
| 6,827,358 B1 * | 12/2004 | Beleski, Jr. | 280/87.041 |
| 2001/0003392 A1 | 6/2001 | Rappaport | |
| 2002/0050695 A1 | 5/2002 | Feng | |
| 2002/0053775 A1 * | 5/2002 | Feng | 280/87.041 |
| 2002/0063406 A1 | 5/2002 | Feng | |
| 2002/0063411 A1 | 5/2002 | Feng | |
| 2002/0064417 A1 | 5/2002 | Feng | |
| 2002/0070519 A1 | 6/2002 | Rappaport | |
| 2003/0006569 A1 | 1/2003 | Combs | |
| 2003/0090076 A1 | 5/2003 | Beleski, Jr. | |
| 2004/0032105 A1 * | 2/2004 | Tsai | 280/87.041 |
| 2004/0178597 A1 * | 9/2004 | Tang | 280/87.041 |

* cited by examiner

CAMBERING VEHICLE HAVING FOLDABLE STRUCTURE

BACKGROUND OF THE INVENTION

1. Field of the Invention

The present invention relates to a cambering vehicle, and more particularly to a cambering vehicle having a foldable structure.

2. Description of the Prior Art

Various kinds of typical cambering vehicles have been developed as operator propelled three wheeled vehicle, and comprise a front column having a steering shaft rotatably attached thereto, a front wheel attached to bottom of the steering shaft, and a pair of laterally spaced rear wheels on trailing arms which are articulated to the front column.

As the vehicle travels a sinusoidal path, the operator shifts his or her weight to the inside of each turning arc, to shift the center of mass to the inside of each arc, and to result a series of accelerations due to the conservation of momentum of the vehicle and operator, and thus to attain a forward motion.

For example, U.S. Pat. No. 4,123,079 to Biskup, U.S. Pat. No. 4,133,551 to Biskup, U.S. Pat. No. 6,220,612 to Beleski, Jr., U.S. Pat. No. 6,467,986 to Feng, and U.S. Pat. No. 6,517,093 to Feng, disclose five examples of the typical cambering vehicles.

However, the typical cambering vehicles may not be easily folded to a compact configuration.

In addition, the trailing arms have the front ends rotatably or pivotally secured to the front column with an attachment fitting or shaft that is perpendicular to the front column. When the vehicle is moved toward one side, such as the right side, the left trailing arm and thus the left rear wheel may be forced or caused to be moved upwardly away from the ground, or may not be suitably contacted with the ground.

One the contrary, when the vehicle is moved toward the other side or the left side, the right trailing arm and thus the right rear wheel may also be forced or caused to be moved upwardly away from the ground, or may not be suitably contacted with the ground, such that the vehicle may not be stably travels along the sinusoidal path.

The present invention has arisen to mitigate and/or obviate the afore-described disadvantages of the conventional cambering vehicles.

SUMMARY OF THE INVENTION

The primary objective of the present invention is to provide a cambering vehicle including a structure for allowing the cambering vehicle to be folded to a compact configuration.

The other objective of the present invention is to provide a cambering vehicle including a left and a right trailing arm rotatably or pivotally attached to a front column with inclined axles, to allow the trailing arms and the rear wheels to be moved without being moved upwardly away from the ground.

The further objective of the present invention is to provide a cambering vehicle including a left and a right trailing arm rotatably or pivotally attached to a front column with inclined axles, to change moving stroke of the vehicle.

In accordance with one aspect of the invention, there is provided a cambering vehicle comprising a front column, a bracket rotatably attached to the front column with a pivot shaft, to allow the bracket to be rotatable relative to the pivot shaft, and rotatable toward the front column to a working position, and rotatable away from the front column to a folding position, the bracket including a longitudinal axis, a left and a right trailing arm each including a front portion pivotally attached to the bracket with a pivot axle, and each including a rear portion having a rear wheel attached thereto, and each including a foot pedal disposed thereon to support users, and a detachably latching device for detachably latching the bracket and thus the left and the right trailing arm to the front column at the working position. The bracket and thus the left and the right trailing arm may be rotated relative to the front column to the folding position when the detachably latching device releases the bracket relative to the front column.

Each of the front portions of the left and the right trailing arms includes a bushing attached thereto and rotatably attached onto the pivot axles respectively. The pivot axles are preferably inclined relative to the longitudinal axis of the bracket. A braking device may further be provided for braking the rear wheels.

The front column includes a front tube, a steering shaft rotatably disposed concentrically within the front tube, a front wheel provided on bottom of the steering shaft, and a handle provided on top of the steering shaft. The steering shaft includes a stem adjustably disposed thereon to adjustably support the handle on the steering shaft.

A coupling device may further be provided for coupling the left and the right trailing arms together. The coupling device includes a link pivotally coupled between the left and the right trailing arms. The link includes a first end pivotally secured to one of the left and the right trailing arms with a pivot pin, and a second end pivotally secured to the other of the left and the right trailing arms with a latch pin.

Each of the left and the right trailing arms includes at least one ear provided thereon, and the link includes two ends pivotally secured to the ear of the left and the right trailing arms with pins.

The bracket includes two socket openings formed therein, the front portions of the left and the right trailing arms are rotatably secured in the socket openings of the bracket with the pivot axles respectively. For example, the bracket includes two frames provided therein to define the socket openings thereof respectively.

The detachably latching device includes a latch device attached to the front column, to selectively engage with the bracket, and thus to selectively secure the bracket to the front column at the working position. The front column includes an extension extended therefrom to support the latch device, the latch device includes a latch pin extended through the extension of the front column.

The bracket includes a panel having an orifice formed therein, the latch device includes a latch pin extended therefrom and engageable into the orifice of the panel, to detachably secure the panel and the bracket to the front column.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Referring to the drawings, and initially to FIGS. 1–6, a cambering vehicle 1 in accordance with the present invention comprises a front column 2 including a front tube 20, a steering shaft 30 rotatably engaged or disposed concentrically within the front tube 20, a front fork 31 attached to bottom of the steering shaft 30 to support a front wheel 32, and a handle 34 supported on top of the steering shaft 30.

The steering shaft 30 may further include a stem 33 retractably received therein and extendible outwardly therefrom, or adjustably secured to the steering shaft 30 with such as a quick release clamp 39. The handle 34 is secured on top of the steering shaft 30 or on top of the stem 33 of the steering shaft 30. One or more, such as two brake hand grips 35 are attached to the handle 34 for braking purposes, and are coupled to cables 36 respectively.

The front column 2 includes an extension 21 attached to or extended from the front tube 20, such as attached to the upper portion 22 of the front tube 20. A spring-biased latch device 23 is attached to the extension 21 of the front tube 20, and includes a latch pin 24 extendible through the extension 21 of the front tube 20, and extendible downwardly toward the lower portion 25 of the front tube 20.

A bracket 7 is rotatably or pivotally attached to the front tube 20 of the front column 2 with a pivot shaft 71. For example, as shown in FIGS. 7–8 and 10–11, the bracket 7 includes a lower portion 70 rotatably or pivotally attached to the lower portion 25 of the front tube 20 with the pivot shaft 71, to allow the bracket 7 to be rotated relative to the front tube 20.

Figure 8:
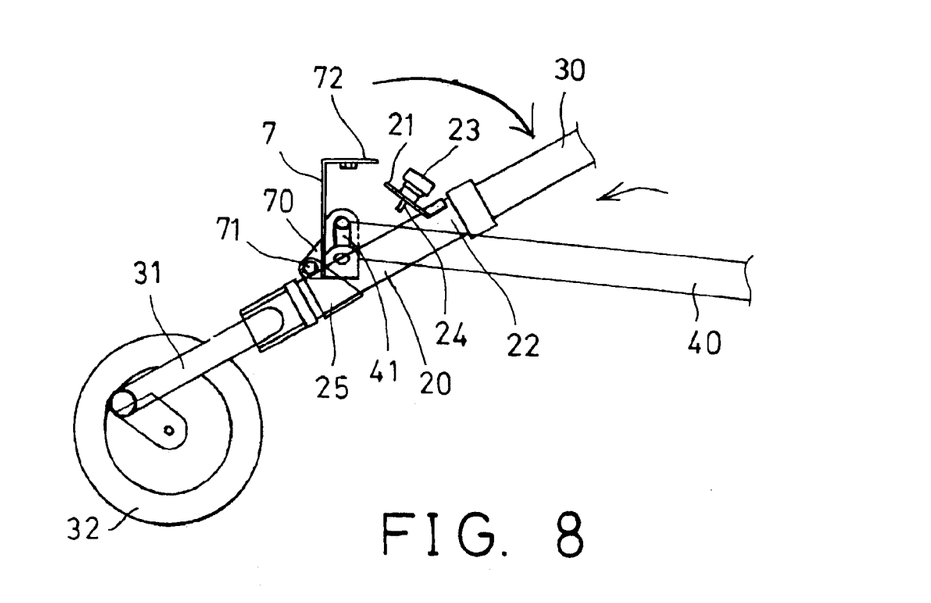
Figure 11:
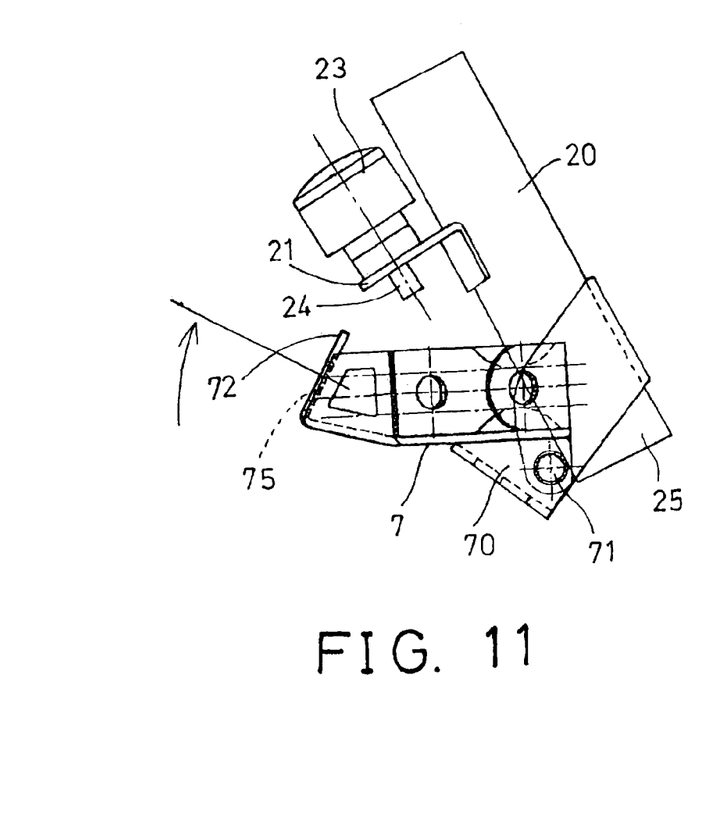

The bracket 7 includes an upper panel 72 having an orifice 73 formed therein for receiving the latch pin 24 of the latch device 23 which may detachably or openably secure the upper panel 72 of the bracket 7 to the front tube 20. For example, the bracket 7 may be rotated relative to or away from the front tube 20 when the latch pin 24 of the latch device 23 is disengaged from the upper panel 72 of the bracket 7, as shown in FIGS. 8, 11.

Figure 1:
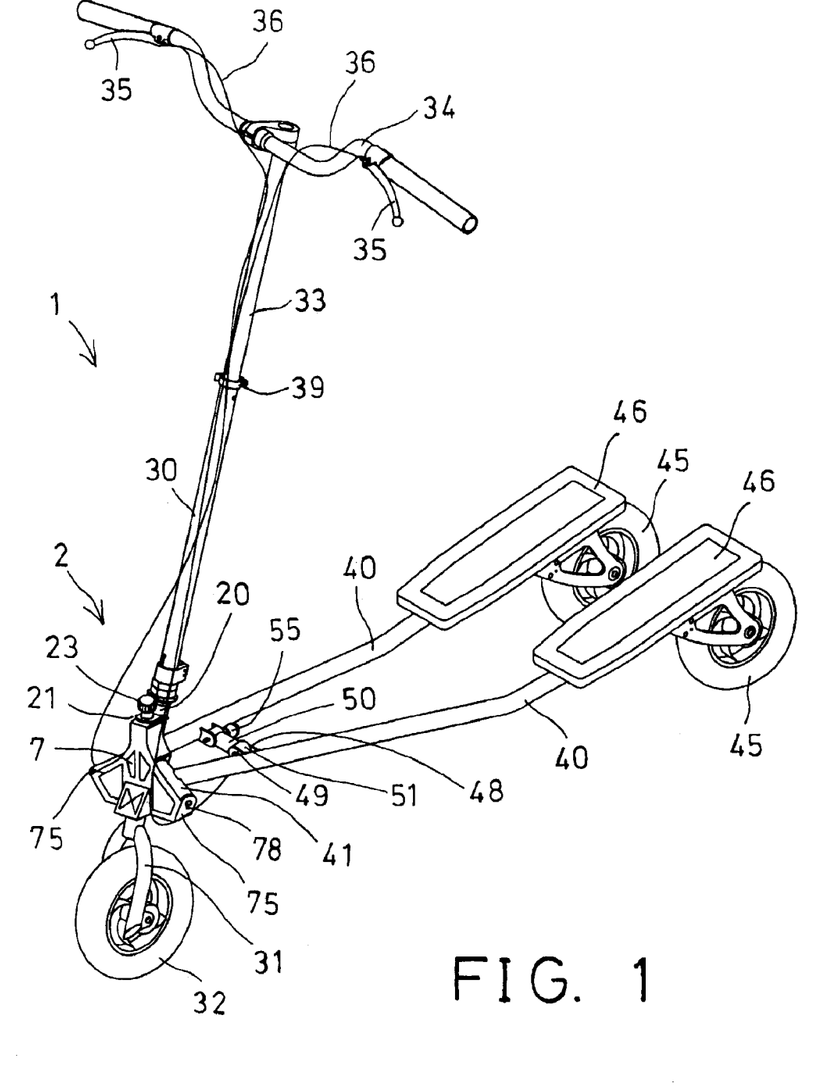
FIG. 1 is a perspective view of a cambering vehicle in accordance with the present invention.
Figure 2:
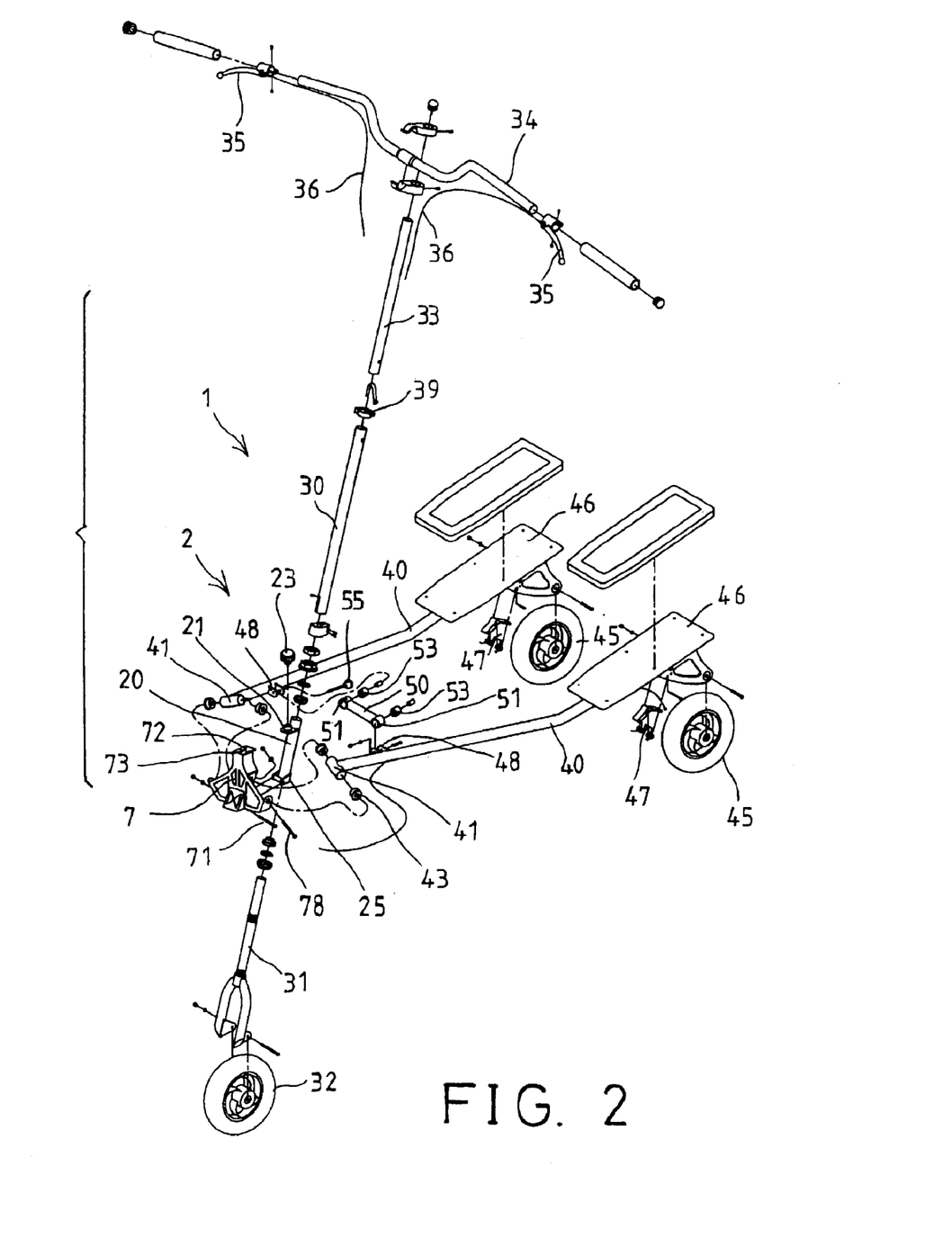
FIG. 2 is an exploded view of the cambering vehicle.
Figure 3:
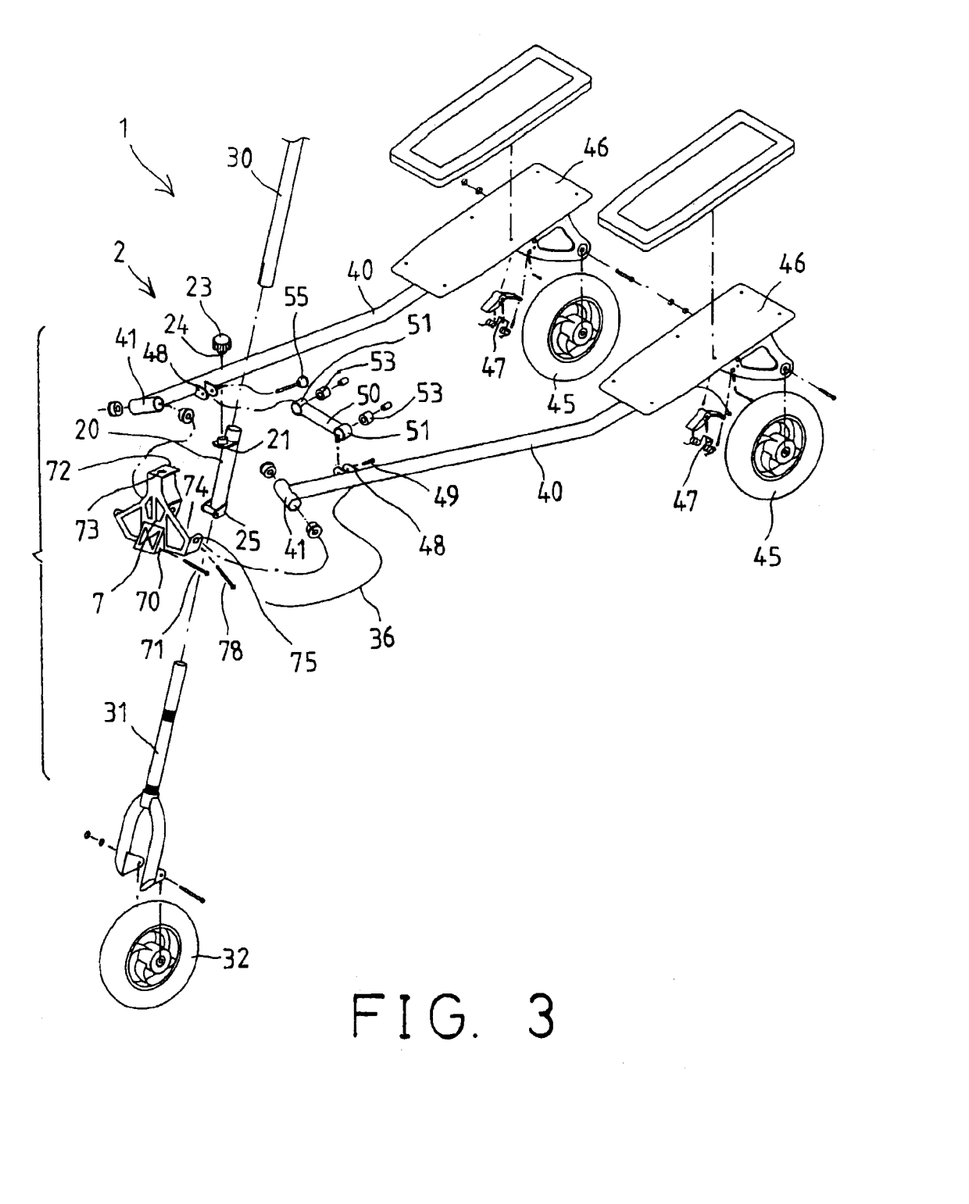
FIG. 3 is an enlarged partial exploded view of the cambering vehicle.
Figure 4:
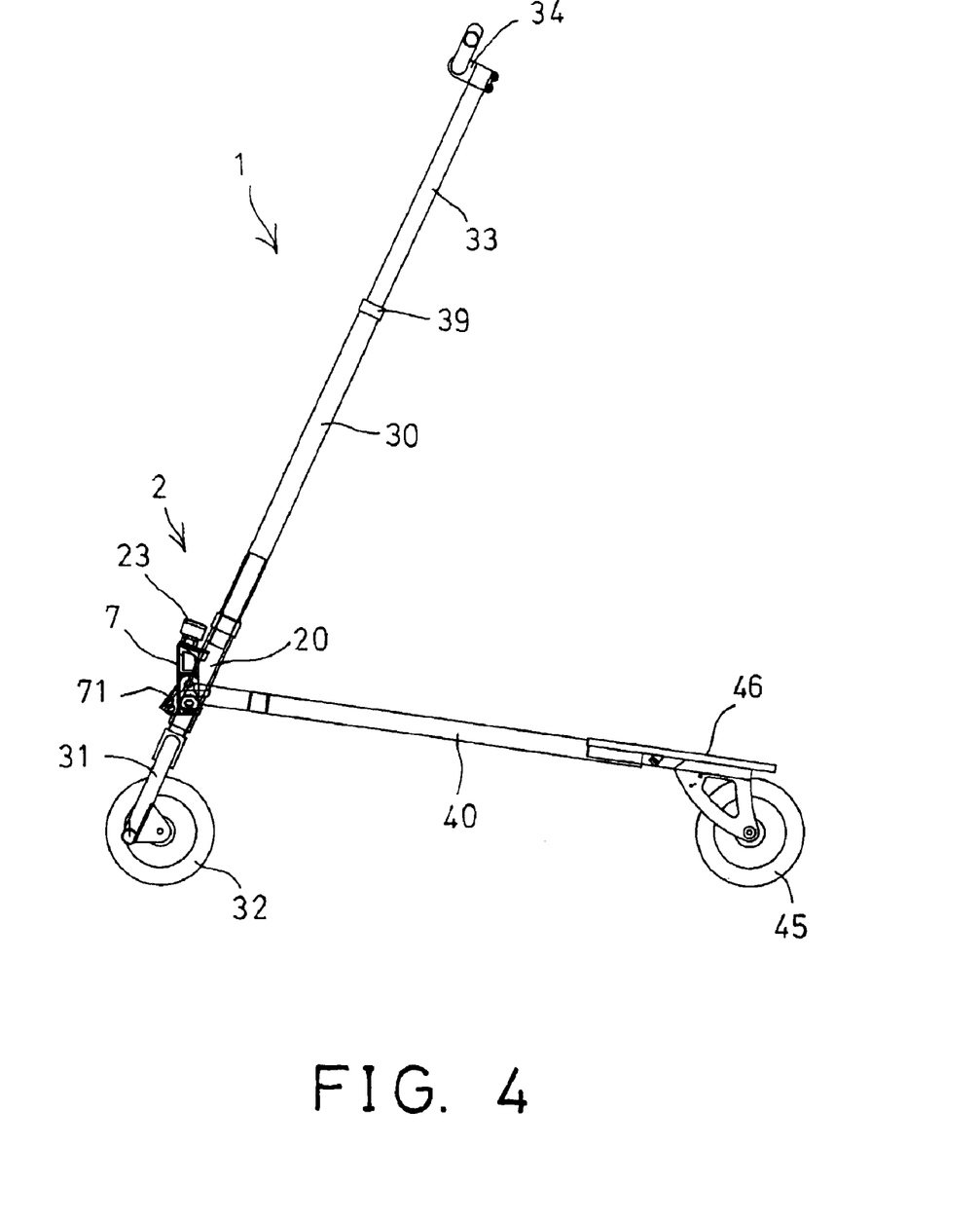
FIG. 4 is a side view of the cambering vehicle.
Figure 5:
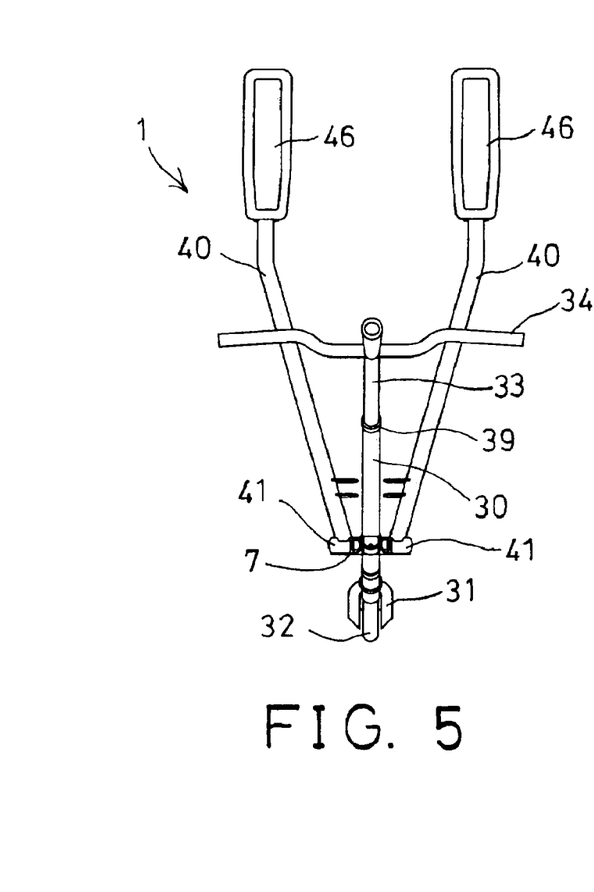
FIG. 5 is a top view of the cambering vehicle.
Figure 6:
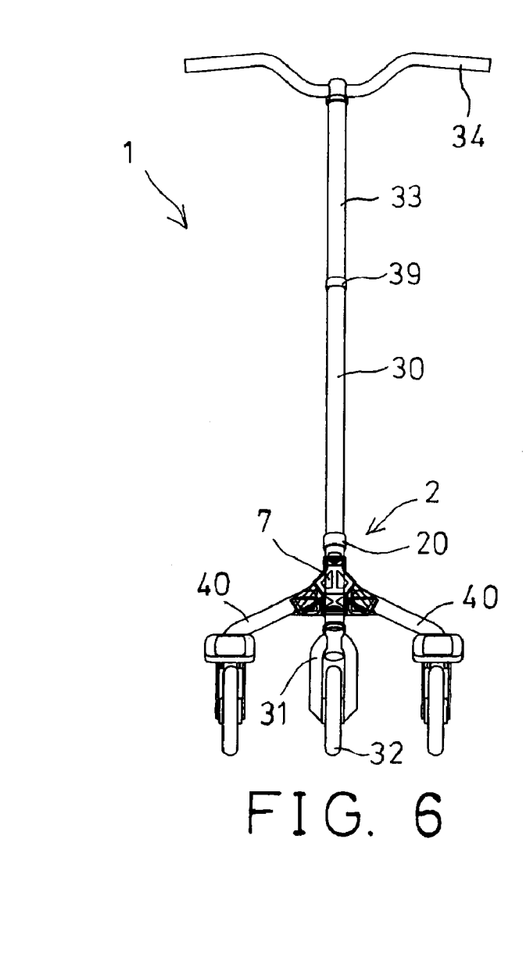
FIG. 6 is a front view of the cambering vehicle.
Figure 7:
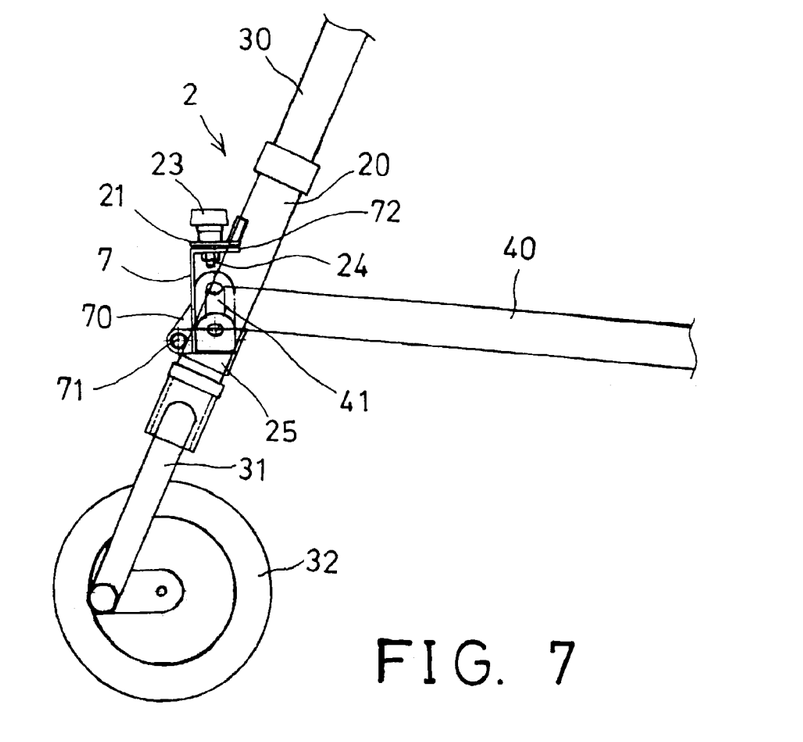
FIGS. 7, 8 are enlarged partial side views illustrating the folding operation of the cambering vehicle.
Figure 10:
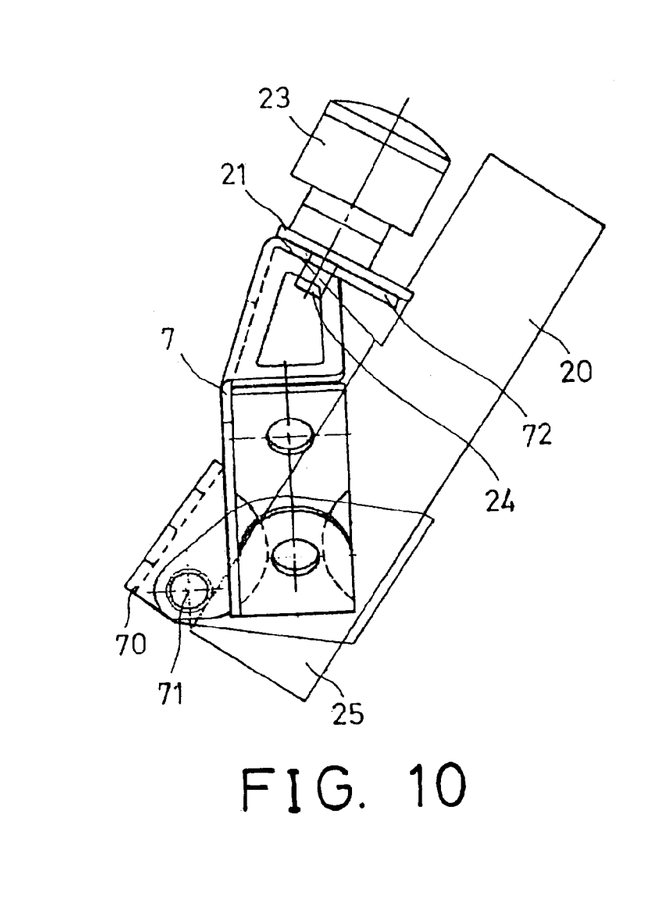
FIGS. 10, 11 are enlarged partial side views similar to FIGS. 7 and 8 respectively, illustrating the folding operation of the cambering vehicle.

As shown in FIGS. 7, 10, when the latch pin 24 of the latch device 23 is engaged into the orifice 73 of the upper panel 72 of the bracket 7, the bracket 7 may be solidly secured to the front tube 20 with the spring-biased latch device 23. The spring-biased latch device 23 may thus be used as a latching means or device to detachably secure the bracket 7 to the front tube 20.

The bracket 7 includes two socket openings 74 formed therein and defined by two frames 75 respectively, and each having a longitudinal axis or pivotal axis 76 inclined relative to the longitudinal axis 77 of the bracket 7 (FIG. 9) that is parallel to the front tube 20, such that the socket openings 74 and/or the frames 75 may also be arranged and inclined relative to the front tube 20 when the bracket 7 is secured to the front tube 20 (FIGS. 1, 4, 6, 7).

Figure 9:
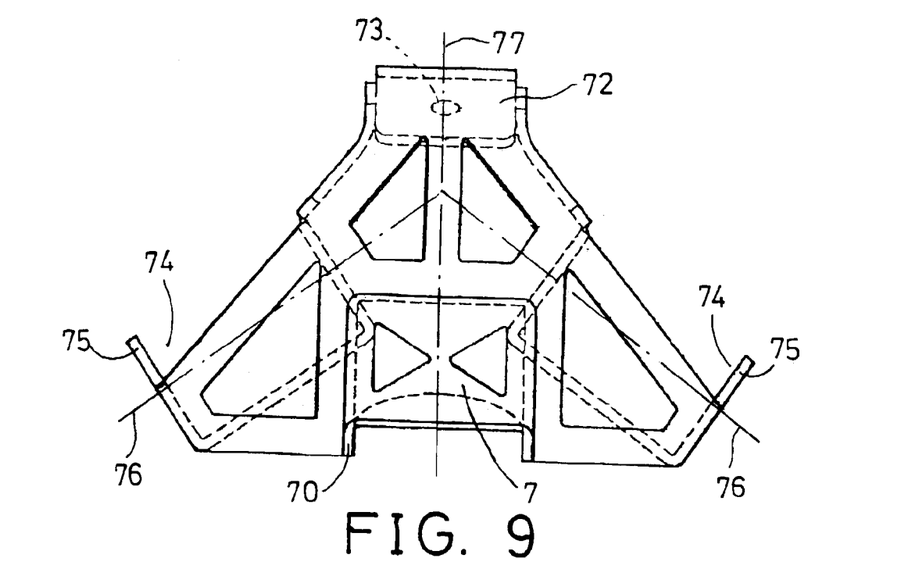
FIG. 9 is a front view of a bracket of the cambering vehicle.
Figure 12:
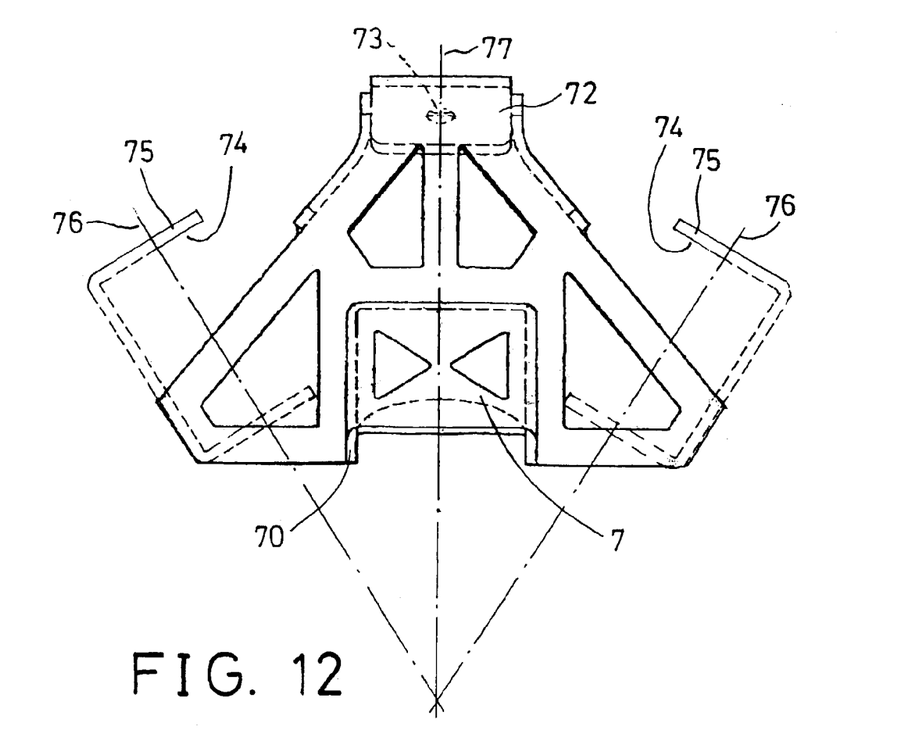
FIG. 12 is a front view of the bracket, similar to FIG. 9, illustrating the other arrangement of the bracket of the cambering vehicle.

As shown in FIG. 9, the pivotal axes 76 of the socket openings 74 and/or the frames 75 are illustrated to be extended inclinedly and downwardly relative to the bracket 7. However, the pivotal axes 76 of the socket openings 74 and/or the frames 75 may also be arranged in different inclination relative to the bracket 7. For example, as shown in FIG. 12, the pivotal axes 76 of the socket openings 74 and/or the frames 75 may also be arranged to be extended inclinedly and upwardly relative to the bracket 7.

A left trailing arm and a right trailing arm 40 each include a front portion rotatably or pivotally attached to the bracket 7 with pivot axles 78 respectively. For example, each of the trailing arms 40 includes a bushing 41 attached or provided on the front portion thereof, and rotatably attached onto the pivot axles 78 that are secured to the frames 75 of the bracket 7 respectively, for rotatably or pivotally coupling the trailing arms 40 to the front tube 20 with the bracket 7.

The front portions or the bushings 41 of the trailing arms 40 may be rotatably attached to the pivot axles 78 respectively with washers, gaskets, bearings 43 or the like, for allowing the front portions or the bushings 41 of the trailing arms 40 to be rotatably coupled to the front tube 20. Each of the trailing arms 40 includes a rear wheel 45 rotatably attached to the rear end, a foot pedal 46 disposed thereon to support users.

The front portions or the bushings 41 of the trailing arms 40 merge the pivotal axes 76 of the socket openings 74 and/or the frames 75 respectively, such that the front portions or the bushings 41 of the trailing arms 40 also arranged to be inclined relative to the longitudinal axis 77 of the bracket 7 that is parallel to the front tube 20.

The cambering vehicle 1 may further include two brake devices 47 attached to the rear portions of the trailing arms 40 respectively, for braking the rear wheels 45 respectively. The brake hand grips 35 are coupled to the brake devices 47 with the cables 36 respectively, in order to actuate the brake devices 47 to brake the rear wheels 45.

Each of the trailing arms 40 includes one or more ears 48 secured thereto or extended therefrom, and the ears 48 of the trailing arms 40 are facing toward each other. A cable or a link 50 includes two ends 51 to be pivotally or rotatably secured to the ears 48 of the trailing arms 40 with gaskets or bearings 53 or the like. One end 51 of the link 50 may be rotatably attached to the ears 48 of one of the trailing arms 40 with a pivot pin 49, and the other end 51 of the link 50 may be rotatably and detachably coupled to the ears 48 of the other trailing arm 40 with a fastener, a latch pin 55 or the like.

In operation, when the vehicle travels a sinusoidal path, and when the operator shifts his or her weight to the inside of each turning arc, to shift the center of mass to the inside of each arc, the front column 2 may thus be tilted relative to the ground, to result a series of accelerations due to the conservation of momentum of the vehicle and operator, and thus to attain a forward motion.

The inclination of the pivot axles 78 relative to the bracket 7 or the front tube 20 respectively may cause or generate different moving stroke of the vehicle as compared with those of the typical cambering vehicles which include a pair of trailing arms having front ends rotatably secured to the front column with an attachment fitting or shaft that is perpendicular to the front column.

The inclination of the pivot axles 78 relative to the front tube 20 of the front column 2 respectively may also be changed or selected to cause different moving stroke of the vehicle, and thus to change the accelerations of the vehicle. It is preferable, but not necessarily, that the pivot axles 78 are arranged symmetric relative to the front column 2 or relative to the bracket 7.

As shown in FIG. 8, when the latch pin 24 of the spring-biased latch device 23 is disengaged from the upper panel 72 of the bracket 7, the bracket 7 and thus the trailing arms 40 may be rotated relative to or toward the front tube 20 or the front column 2 to a compact folding or storing position.

As shown in FIG. 7, when the latch pin 24 of the spring-biased latch device 23 is engaged into the orifice 73 of the upper panel 72 of the bracket 7, the bracket 7 and thus the trailing arms 40 may be solidly secured to the front tube 20 at a working position, and to retain the vehicle in a tricycle-shaped cambering vehicle.

It is to be noted that, due to the inclination of the pivot axles 78 relative to the bracket 7 or the front tube 20, the trailing arms 40 may be rotated or spaced away from each other when the link 50 is disengaged from the trailing arms 40. The foldable structure of the trailing arms 40 toward or relative to the front column 2 allows the cambering vehicle to be folded to a compact folding or storing position.

Accordingly, the cambering vehicle includes a left and a right trailing arm rotatably or pivotally attached to a front column with inclined axles, to allow the trailing arms and the rear wheels to be moved without being moved upwardly away from the ground, and to change the moving stroke of the vehicle. The trailing arms may also be folded relative to the front column between folding or storing positions and working positions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A cambering vehicle comprising:
    a front column,
    a bracket rotatably attached to said front column with a pivot shaft, to allow said bracket to be rotatable relative to said pivot shaft, and rotatable toward said front column to a working position, and rotatable away from said front column to a folding position, said bracket including a longitudinal axis,
    a left and a right trailing arm each including a front portion pivotally attached to said bracket with a pivot axle, and each including a rear portion having a rear wheel attached thereto, and each including a foot pedal disposed thereon to support users, and
    means for detachably latching said bracket and thus said left and said right trailing arm to said front column at said working position,
    said bracket and thus said left and said right trailing arm being rotatable relative to said front column to said folding position when said detachably latching means releases said bracket relative to said front column.

2. The cambering vehicle as claimed in claim 1, wherein each of said front portions of said left and said right trailing arms includes a bushing attached thereto and rotatably attached onto said pivot axles respectively.

3. The cambering vehicle as claimed in claim 1, wherein said pivot axles are inclined relative to said longitudinal axis of said bracket.

4. The cambering vehicle as claimed in claim 1, wherein said front column includes a front tube, a steering shaft rotatably disposed concentrically within said front tube, a front wheel provided on bottom of said steering shaft, and a handle provided on top of said steering shaft.

5. The cambering vehicle as claimed in claim 4, wherein said steering shaft includes a stem adjustably disposed thereon to adjustably support said handle on said steering shaft.

6. The cambering vehicle as claimed in claim 1 further comprising means for braking said rear wheels.

7. The cambering vehicle as claimed in claim 1 further comprising means for coupling said left and said right trailing arms together.

8. The cambering vehicle as claimed in claim 7, wherein said coupling means includes a link pivotally coupled between said left and said right trailing arms.

9. The cambering vehicle as claimed in claim 8, wherein said link includes a first end pivotally secured to one of said left and said right trailing arms with a pivot pin, and a second end pivotally secured to the other of said left and said right trailing arms with a latch pin.

10. The cambering vehicle as claimed in claim 8, wherein each of said left and said right trailing arms includes at least one ear provided thereon, and said link includes two ends pivotally secured to said at least one ear of said left and said right trailing arms with pins.

11. The cambering vehicle as claimed in claim 1, wherein said bracket includes two socket openings formed therein, said front portions of said left and said right trailing arms are rotatably secured in said sock et openings of said bracket with said pivot axles respectively.

12. The cambering vehicle as claimed in claim 11, wherein said bracket includes two frames provided therein to define said socket openings thereof respectively.

13. The cambering vehicle as claimed in claim 1, wherein said detachably latching means includes a latch device attached to said front column, to selectively engage with said bracket, and thus to selectively secure said bracket to said front colunm at said working position.

14. The cambering vehicle as claimed in claim 13, wherein said front column includes an extension extended therefrom to support said latch device, said latch device includes a latch pin extended through said extension of said front column.

15. The cambering vehicle as claimed in claim 13, wherein said bracket includes a panel having an orifice formed therein, said latch device includes a latch pin extended therefrom and engageable into said orifice of said panel, to detachably secure said panel and said bracket to said front column.

* * * * *

UNITED STATES PATENT AND TRADEMARK OFFICE
CERTIFICATE OF CORRECTION

PATENT NO. : 6,880,840 B2
DATED : April 19, 2005
INVENTOR(S) : Jin Chen Chuang

It is certified that error appears in the above-identified patent and that said Letters Patent is hereby corrected as shown below:

Column 1,
Line 13, "vehicle" should read -- vehicles --.
Line 16, "laterally spaced" should read -- laterally-spaced --.
Line 20, "and to result" should read -- to result in --.
Line 38, "One" should read -- On --.
Line 42, cancel the word "be".
Line 43, "travels" should be -- travel --.

Column 2,
Line 8, the first occurrence of "detachably" should read -- detachable --.
Lines 10 and 11, "arm" should read -- arms --.
Line 23, "on bottom" should read -- on the bottom --.

Column 3,
Line 22, "attached to" should read -- attached to the --.
Line 31, insert a comma after "35".

Column 4,
Line 32, insert -- are -- after "40".
Line 56, insert -- in -- after the word "result".
Line 61, insert -- a -- before the word "different".

Column 5,
Line 1, "cause different" should read -- cause a different --.
Lines 57 and 59, "arm" should read -- arms --.

UNITED STATES PATENT AND TRADEMARK OFFICE
CERTIFICATE OF CORRECTION

PATENT NO. : 6,880,840 B2
DATED : April 19, 2005
INVENTOR(S) : Jin Chen Chuang

It is certified that error appears in the above-identified patent and that said Letters Patent is hereby corrected as shown below:

Column 6,
Line 11, "on bottom" should read -- on the bottom --.
Line 40, "sock et" should read -- socket --.

Signed and Sealed this

Sixteenth Day of August, 2005

JON W. DUDAS
*Director of the United States Patent and Trademark Office*